June 24, 1969  R. M. HAINES ET AL  3,452,275
APPARATUS AND METHOD FOR MEASURING FIELD POTENTIAL DIFFERENCES
USING A FIELD RESPONSIVE VARIABLE DIELECTRIC FLUID SENSOR
Filed May 23, 1966

INVENTORS.
ROBERT M. HAINES
DONALD L. KLASS
THOMAS W. MARTINEK

William S. Brown
ATTORNEY.

United States Patent Office 3,452,275
Patented June 24, 1969

3,452,275
APPARATUS AND METHOD FOR MEASURING FIELD POTENTIAL DIFFERENCES USING A FIELD RESPONSIVE VARIABLE DIELECTRIC FLUID SENSOR
Robert M. Haines, Placentia, Calif., and Donald L. Klass, Barrington, and Thomas W. Martinek, Danville, Ill., assignors to Union Oil Company of California, Los Angeles, Calif., a corporation of California
Filed May 23, 1966, Ser. No. 552,047
Int. Cl. G01r 31/02, 27/22
U.S. Cl. 324—72
17 Claims

ABSTRACT OF THE DISCLOSURE

An apparatus and method for measuring the potential difference in a fluid system comprising sensing means communicating with an electrokinetic fluid having a dielectric constant which varies with changes in the potential difference being measured, an electric circuit communicating with the electrokinetic fluid and means to detect and measure the change in dielectric constant of the electrokinetic fluid.

---

This invention relates to an electrokinetic fluid device for measuring and/or detecting field strengths in various systems. More particularly, this invention relates to a device comprising at least one pair of electrodes or receptors connected to opposing plates of an electrokinetic fluid cell, said cell comprising the capacitance of a tuned radio-frequency tank circuit which is resonant at a desired transmitter frequency.

It is often necessary and expedient to measure the field strength of a system. There are numerous devices available for this purpose. However, the prior art devices have made dielectric measurements on such systems as liquid systems by standing wave measurements made on coaxial lines or wave guides wherein the liquid forms the dielectric in a section of the line or guide. These devices are of the cell type and the height of the liquid in the cell is important to the measurement. Since field strength measurements are difficult in the first place, this introduces inaccuracies in the measurements. Devices are available comprising a tubular column with a central rod-like electrode with means for applying ultrahigh frequencies, in the order of 100 to 1000 megacycles per second, to a liquid within the cell and means for measuring the frequency and a crystal type detector the output of which is connected to a microammeter or galvanometer. Such a device is described in United States Patent 2,474,260 by G. R. Leef.

Accordingly, it becomes a primary object of this invention to provide an apparatus for measuring field strengths, and method therefor.

Another object of this invention is to provide an electrokinetic fluid device for measuring field strengths.

A feature of this invention is the provision of means to utilize the change in dielectric constant of an electrokinetic fluid resulting from the exposure of the fluid to changes in applied field strength.

Another feature of this invention is to provide an apparatus for measuring the field strength in a liquid-liquid or liquid-vapor system.

These and other objects and features of the invention will be described or become apparent as the specification proceeds, to include the drawings, wherein.

Figure 1:
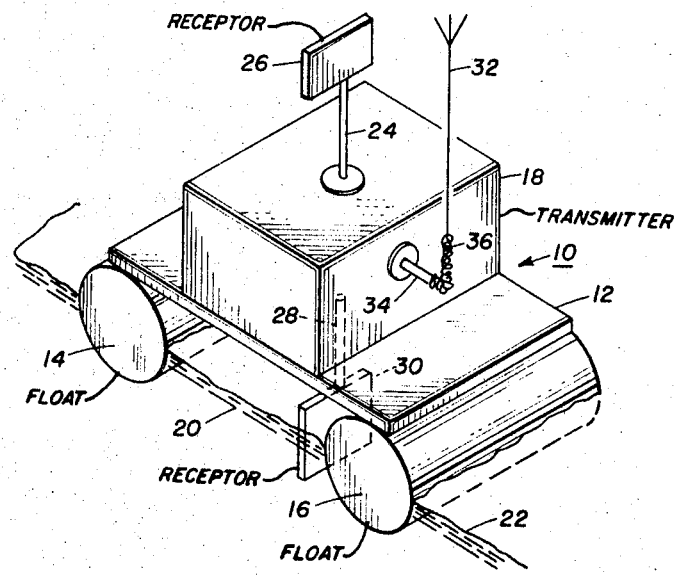
FIGURE 1 is a perspective, partially schematic view of the apparatus as used to detect potential differences in a liquid-vapor system.

Referring to FIGURE 1, the number 10 refers to the apparatus generally, comprising a base 12, mounted on twin cylindrical floats 14 and 16, carrying transmitter 18 upon liquid 20 with the liquid level shown at 22. Transmitter 18 has bracket 24 supporting vapor potential receptor or electrode 26 and bracket 28 supporting liquid potential receptor 30. Resonant frequency antenna 32 is mounted on bracket 34 through spring mounting 36. As illustrated, the floats 14 and 16 support the transmitter 18 so that receptor 26 is in the vapor space above liquid 20 and receptor 30 is within the liquid 20 below liquid level 22.

Figure 2:
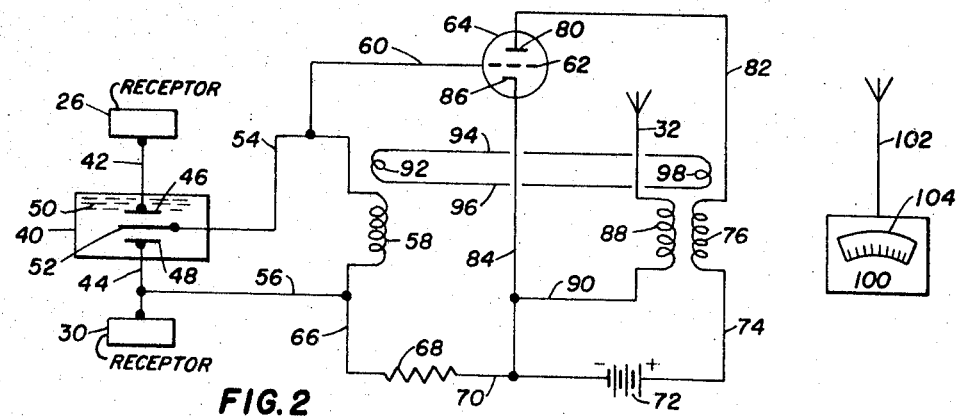
FIGURE 2 is a diagrammatic view of the electrical components of the apparatus, also showing a remote monitor diagrammatically.

FIGURE 2 shows one of many possible forms of circuitry for transmitter 18, illustrated in FIGURE 1, to include receptors 26 and 30, connected to electrokinetic fluid cell 40 by means of electrical leads 42 and 44, respectively, and to electrodes 46 and 48 immersed in electrokinetic fluid 50 within cell 40. Electrokinetic fluid cell 40 has central electrode 52 and the latter is connected to lead 54, while lead 56 connects the cell through lead 44 across inductance 58. One side of the circuit is connected through lead 60 (connected to lead 54) to the grid 62 of vacuum tube 64. The other side of the circuit is connected by lead 66 (from lead 56) through resistance 68, lead 70, battery 72, lead 74, primary winding 76 of transformer 76–88, and back to plate 80 of tube 64 by means of lead 82. Lead 84 connects lead 70, between resistance 68 and battery 72, to cathode 86 of tube 64. The antenna 32 connects to the secondary winding 88 of transformer 76–88, and winding 88 connects through lead 90 to cathode lead 84. A feedback coupling designed to sustain the oscillation is provided by means of coil 92, leads 94 and 96 and coil 98, coupled with coils 58 and 76, respectively. A remote monitor station is illustrated at 100 having antenna 102, to receive a variable frequency signal whose frequency varies in proportion to the frequency change at antenna 32. Variation in frequency received, from a standard calibrated frequency will produce a dial 104 reading directly in field strength and representing the actual field strength between receptors 26 and 30.

Figure 3:
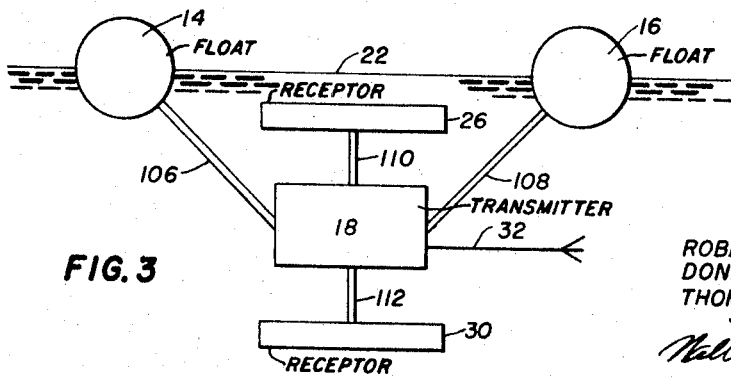
FIGURE 3 is a schematic view of the apparatus as used in a system having potential static change buildup.

FIGURE 3 is a diagrammatic view showing floats 14 and 16 supporting transmitter 18 by means of supports 106 and 108, antenna 32 attached to transmitter 18, and receptors 26 and 30, mounted on transmitter 18 by means of supports 110 and 112, below liquid lever 22. This embodiment of the apparatus, for example, is useful in petroleum tanks storing petroleum hydrocarbons where the presence of any conductive material, that is, more conductive than the hydrocarbon, floating on the surface is a potential discharge hazard because of the tendency to build up a static charge in excess of the surrounding area, tank sides, etc. Thus, in FIGURE 3, floats 14 and 16 are constructed of a material of low electrical conductivity such as plastic, rubber, foamed plastic, etc., or at least having a conductivity that is the same as or less than that of the hydrocarbon represented by liquid level 22. In this embodiment, transmitter 18 is constructed within a liquid-tight container in a manner well known in the art.

In the embodiment shown in FIGURE 3 both of the potential receptors 26 and 30 are below the liquid level 22 and, as a result, the static charge buildup which would be caused by a conductive substance dissolved in the top layer or existing at the interface between the vapor and the liquid phases is greatly reduced, if not completely eliminated. A difference in potential still exists between receptors 26 and 30 under the conditions of charge accumulation in material in which the device is in contact or floating, as in a tank. The potential measured under the surface 22 by means of receptors 26 and 30 is directly related to the potentials above the surface 22 because both the measured field strength in the liquid and that present in the space above the liquid surface 22 originate in the same surface charge domain. By proper choice of materials of construction, the effective dielectric constant and resistivity of the apparatus can be established so as not to distort the electric field being measured. Accordingly, the embodiment of FIGURE 3 is designed to reduce to a minimum any potential static hazards that may exist in the surface charge domain under measurement caused by the addition of the measuring device.

The device of this invention utilizes the change in dielectric constant of an electrokinetic fluid resulting from exposure of the fluid to changes in an applied field strength. This change in dielectric constant of cell 40 in turn changes the resonant frequency of the tuned circuit, comprised of cell 40 and inductance 58. This change in resonant frequency results in a change in transmitted frequency. The frequency of transmission is then converted to field strength reading on dial 104 at remote monitor station 100.

Operation of the apparatus is as follows:

Referring to FIGURE 2, potential receptors 26 and 30 are attached to electrodes 46 and 48 in electrokinetic fluid cell 40 by leads 42 and 44. Electrodes 46 and 48, along with electrode 52, form a three-electrode capacitor, designated as the cell 40 with the electrokinetic fluid 50 as the dielectric between these electrodes. The existence of a potential difference between potential receptors 26 and 30 results in application of a field between electrodes 46 and 48, resulting in a change in dielectric constant of the electrokinetic fluid dielectric 50. This change is proportional to the potential applied. Electrodes 52 and 48 and the dielectric 50 between them constitute the capacitive portion, and inductance 58 the inductive portion, of a tuned frequency resonant grid circuit. Any change in the dielectric constant of the electrokinetic fluid 50 between the electrodes 52 and 48 results in a change in capacitance and a resulting change in the resonant frequency of the tuned grid circuit. Because the transmitter oscillation frequency is controlled by the resonant frequency of the grid circuit, a change in the capacitance of cell 40 results in a change in transmitted frequency. The balance of the circuit is common oscillation circuitry and is obvious to those skilled in the art.

Electrodes 26 and 30 may be of any shape or size in relation to the other components of the apparatus and are constructed of conducting metals or alloys such as brass, aluminum, copper, steel, etc. Cell 40 is an insulated casing designed to hold fluid 50 and electrodes 46, 48 and 52 in spaced relationship to each other. Cell 40 may be constructed of rubber, Bakelite, plastic, resin, ceramics and any other electrical insulating material. Transmitter 18 is custom designed as shown for the particular frequencies required. The receiver at monitor station 100 is a custom designed, superheterodyne receiver or may be any other receiver capable of frequency measurement.

From this description of the apparatus it is seen that the device of this invention includes receptor means for detecting a potential difference or a field strength within an environment or surface domain (electrodes 26 and 30 and leads 42 and 44). The means for detecting a potential difference are connected to an electrokinetic fluid cell which has a dual function. First, the application of a potential difference across electrodes 46 and 48 causes a change in the dielectric constant of electrofluid 50 therein. Secondly, this change in dielectric constant of the electrokinetic fluid in cell 50 causes a change in the resonant frequency of the tuned grid circuit. Electrodes 46 and 48 function to apply the potential difference to the electrokinetic fluid. The change in the dielectric constant of the fluid is sensed between electrodes 48 and 52. Electrode 48 is a common electrode to both circuits. Accordingly, the means for applying the potential difference to an electrokinetic fluid cell comprises electrodes 46 and 48 and the means for detecting the change in dielectric constant of the cell comprises electrodes 48 and 52. The electrokinetic cell, by which is meant the housing, the fluid and the electrodes 46, 48 and 52, becomes then the means for both responding to the detected potential difference and changing the capacitance of the tuned grid circuit.

A feature of the invention is the incorporation of the electrokinetic fluid cell as the capacitance segment of a radio-frequency tuned circuit which may be a vacuum tube or a transistor (solid state circuitry). The vacuum tube or transistor forms the oscillator means in a radio frequency transmitter. A further feature of the invention is to provide float means which either suspend the apparatus at the liquid level of a liquid-vapor system, with one receptor in the liquid and one receptor in the vapor, or suspend the unitized capacitor cell and tuned grid circuit and both receptors below the liquid level with receptor nearer the surface than the other, i.e., vertically spaced therein.

There are various fluid compositions which have the property of changing resistance and/or dielectric constant when subjected to an electric field of high potential. For purposes of this description we call these fluids electrokinetic fluids. Such fluids, for example, are described in U.S. Patents to W. M. Winslow; 2,661,596, 2,661,825 and 3,047,507.

For example a fluid of the following composition

| Ingredient: | Wt. percent |
| --- | --- |
| Refined lubricating oil | 30.5 |
| Silica | 50.0 |
| Glycerol monooleate | 5.5 |
| Ethylene glycol | 4.0 |
| 1-hydroxyethyl-1-decenylimidazoline | 10.0 | when placed in cell 40 will function in accordance with this invention. In general, the electrokinetic fluids are comprised of about 5 to 50% by volume of particulate nonconducting materials dispersed in a non-polar oleaginous vehicle which is weakly absorbed by the particulate material and has a dielectric constant less than about 5. The nonconducting particles are of a piezoelectric or non-piezoelectric material, have an average size in the range of about 0.1 to 5.0 microns diameter, and include, for example, finely-divided silica, calcium titanate, barium titanate, aluminum octoate, aluminum stearate, crystalline D-sorbitol, and zinc stearate. The oleaginous vehicle is preferably a refined mineral oil fraction having a viscosity within the range of about 50 to 300 SUS at 100° F. and an initial boiling point greater than about 500° F. However, a wide variety of nonpolar oleaginous vehicles which are weakly absorbed by the non-conducting particles can be employed, such as white oils, transformer oils, synthetic oils, resulting from the polymerization of unsaturated hydrocarbons, fluorinated hydrocarbons in the lubricating oil viscosity range, tributyl phosphate, etc. Where relatively large volumes of the non-conducting particles are incorporated in the electrokinetic fluid, it is usually necessary to add a material to fluidize the mixture and keep the viscosity of the product electrokinetic fluid at a reasonable level. For this purpose, up to about 25% by volume of a neutral surfactant, such as polyoxyalkylene ethers, glycerol monooleate, sorbitan sesquioleate, etc., can be incorporated to maintain a mixture of the particles and vehicle as a fluid. A variety of polar materials, including water and lower hydroxy-substituted hydrocarbons may be used in an amount of about 1 to 15% by volume to further activate the electrokinetic fluid. Reference is made to U.S. Patent 3,047,507, which is hereby incorporated by reference, for a further description of the electrokinetic fluids.

In general, the measuring device of this invention will operate satisfatcorily when the electrokinetic fluids are subjected to transient or stable electric potentials having a maximum magntdue wthin the range of about 1000 to 10,000 volts, although other voltages may be used. The thickness of the electrokinetic fluid film between the electrodes 46, 48 and 50 will generally be above about 0.001 to 0.100 inch, and preferably will be about 0.005 to 0.030 inch.

As is apparent from the foregoing specification this invention comprises an electrical device for measuring a potential difference in a fluid environment comprising the combination of means to detect the electrical potential or field, means to change the detected difference to a proportional change in an electrical property, such as resistance, dielectric constant etc., means to detect this change in electrical property and means to transmit and/or record a signal proportional thereto. The invention also relates to the method of measuring the relative strengths of electrical fields in two zones within a fluid environment by applying the strengths across an electrokinetic fluid whose dielectric constant changes in an amount proportional to a change in the difference between the strengths of the fields in the two zones, and detecting this change in electrical property as a measure of the relative field strengths in the two zones of the environment.

Other equivalent means to accomplish these results and method steps will become apparent to one skilled in the art. The sensing electrodes 26 and 30 need not be rectangular in shape and may be in the form of a grid, sphere, block or plate. Also, the electrode plates 46, 48 and 52 may be any desired shape or configuration. The cell 40 may be cubical, spherical or irregular in shape. The float means may be of similar configuration and the apparatus may be used totally submerged in a liquid environment, partially submerged at the interface of a fluid-vapor environment or entirely within a vapor or gaseous environment. Althouh separate float means are shown in FIGURES 1 and 3, same may be integral with the transmitter body 18. The float means can be adapted to suspend the device within a liquid environment as in FIGURE 3 or at the interface as in FIGURE 1 or entirely within a vapor or gaseous environment.

The embodiments of this invention in which an exclusive property or privilege is claimed are defined as follows.

We claim:

1. An electrical device for measuring a potential difference which comprises, in combination: a pair of spaced electrodes exposed within the environment of said potential difference; an electrokinetic fluid cell comprising a housing, an electrokinetic fluid contained within said housing, said electrokinetic fluid being one whose dielectric constant varies with changes in said potential difference, two spaced electrode plates within said fluid each connected to one of said electrodes in said environment, a third electrode plate spaced within said fluid between said two electrode plates and connected to electrical means for detecting a change in the dielectric constant of said fluid, and means for connecting one of said two spaced electrode plates to said electrical detecting means.

2. An electrical device in accordance with claim 1 in which said electrokinetic fluid cell is connected to said electrical means by said second and third plates as the capacitance segment of a radio-frequency tuned circuit.

3. An electrical device in accordance with claim 2 in which said tuned circuit controls the oscillation frequency of a vacuum tube oscillator.

4. An electrical device in accordance with claim 2 in which said tuned circuit controls the oscillation frequency of a transistor oscillator.

5. An electrical device in accordance with claim 1 in which said means to transmit a signal proportional to said detected change in dielectric constant is a radio-frequency transmitter.

6. An electrical device as defined in claim 1 wherein said electrokinetic fluid comprises particulate nonconducting materials dispersed in a nonpolar oleaginous liquid.

7. An electrical device as defined in claim 6 wherein said fluid includes a surfactant and a polar liquid.

8. An electrical device as defined in claim 7 wherein said particulate material is silica having a particle diameter between 0.1 and 5.0 microns, wherein said oleaginous liquid has a viscosity between 50 and 300 SUS at 100° F. and has a dielectric constant less than about 5, and wherein said polar liquid is selected from the group consisting of water and a lower hydroxy-substituted hydrocarbon.

9. An electrical device for measuring a potential difference comprising, in combination, a pair of spaced receptor electrodes adapted to be within the environment of an electrical potential difference, an electrokinetic cell comprising a housing, an electrokinetic fluid in said housing whose dielectric constant varies with said potential difference and a pair of electrode plates oppositely spaced from each other and from a third electrode plate therebetween and within said electrokinetic fluid, means to couple each of said spaced receptor electrodes with one of said pair of electrode plates in said cell, a radio frequency tuned circuit, means to connect said third electrode plate and one of said coupled electrodes and said electrokinetic fluid as the capacitance segment of said tuned circuit thereby being adapted to send a frequency-modified radio signal proportional to said potential difference.

10. An electrical device in accordance with claim 9 in combination with a remote monitor receiving means adapted to receive and convert said transmitted radio signal into an electrical signal proportional to said detected potential difference.

11. An electrical device in accordance with claim 9 having a unitized cell and transmitter circuit, means to float said unit on a liquid surface constituting a portion of said environment, one said receptor electrode being located below the flotation level of said float means and the other receptor electrtode being located above the flotation level of said float means and within a second portion of said environment.

12. An electrical device in accordance with claim 11 in which said unitized cell and transmitter circuit and both of said receptor electrodes are below the flotation level of said float means, and said receptor electrodes are spaced therefrom in said liquid.

13. A device for detecting the relative strength of an electrical field within a fluid environment comprising an electrokinetic fluid cell comprising a housing, an electrokinetic fluid contained within said housing, said electrokinetic fluid being one whose dielectric constant varies with the potential difference of said field, a pair of opposed electrode plates disposed within said electrokinetic fluid, a third electrode plate located between and spaced from said opposed electrode plates, whereby said third electrode plate and one of said opposed electrode plates constitute an electrical capacitor, means for connecting said capacitor to a radio-frequency tuned circuit; and means connected to said pair of opposed electrode plates for suspending field sensing electrodes within said fluid environment.

14. A device in accordance with claim 13 in which said tuned circuit controls the oscillation frequency of a vacuum tube oscillator.

15. A device for detecting the relative strength of an electrical field between a body of liquid and the atmosphere above the body of liquid comprising float means, an electrokinetic fluid cell attached to said float means, an electrokinetic fluid therein whose dielectric constant varies with the potential difference, a field sensing electrode extending from said cell to a point above the level of buoyancy of said float means, a second field sensing electrode extending from said cell to a point below the level of buoyancy of said float means, said first and second field sensing electrodes being serially connected to opposed spaced electrode plates within the fluid of said cell, a third electrode plate located in the space between said opposed electrode plates, said electrode plate in conjunction with one of the field electrodes constituting the capacitor of a tuned resonant frequency grid circuit of an oscillator-transmitter adapted to transmit a signal proportional to the electric field sensed by said electrodes.

16. A device in accordance with claim 15 in combination with a remote receiver to pick up and record said signal.

17. The method of measuring the relative strength of an electrical field within a fluid environment which comprises sensing the potential difference between two spaced points within said environment; applying the sensed potential difference across two spaced electrodes positioned within a body of an electrokinetic fluid whose dielectric constant changes in proportion to said potential difference; and measuring the change in the dielectric constant of said electrokinetic fluid by electrical means connected to one of said spaced electrodes and to a third electrode disposed between said two spaced electrodes.

References Cited

UNITED STATES PATENTS

| | | | |
|---|---|---|---|
| 2,851,618 | 9/1958 | Krawinkel. | |
| 2,934,700 | 4/1960 | Holaday | 324—61 |
| 2,969,503 | 1/1961 | Bustin | 324—72 |

RUDOLPH V. ROLINEC, *Primary Examiner.*

E. L. STOLARUN, *Assistant Examiner.*

U.S. Cl. X.R.

317—246; 324—61